United States Patent [19]

Callahan et al.

[11] 3,901,715

[45] Aug. 26, 1975

[54] ANTISTATIC CARBOXYALKYLATED DIAMINES

[75] Inventors: John J. Callahan, Park Ridge; Sydney H. Shapiro, Chicago, both of Ill.

[73] Assignee: Akzona Incorporated, Asheville, N.C.

[22] Filed: Jan. 19, 1973

[21] Appl. No.: 324,916

[52] U.S. Cl.................. 106/2; 260/78 R; 260/857; 260/DIG. 19
[51] Int. Cl............................................ C09k 3/16
[58] Field of Search.................. 106/2; 260/DIG. 19

[56] References Cited
FOREIGN PATENTS OR APPLICATIONS
43-3001    3/1968    Japan Primary Examiner—Theodore Morris
Attorney, Agent, or Firm—Francis W. Young; Philip M. Pippenger

[57] ABSTRACT

Disclosed herein are novel 0-carboxyalkylated and ethoxylated diamines and modified polyamides containing the diamines. When employed in modification of polyamides, the diamines impart very good antistatic properties to the polyamide thereby greatly increasing the comfort and wearability of fabrics made from the modified polyamide.

2 Claims, No Drawings

ANTISTATIC CARBOXYALKYLATED DIAMINES

BACKGROUND OF THE INVENTION

The accumulation of electrical charge to produce static electricity creates many problems. For example, to prevent explosion of liquid hydrocarbons, U.S. Pat. No. 3,359,086 teaches that amphoteric salts may be added to dissipate the electrical charge.

Synthetic fibers also have a tendency to become charged with static electricity. To prevent such electrification, various methods are available such as effecting adhesion of a surfactant having antistatic properties to the surface of said fibers; the antistatic effect of such surfactants, however, is generally temporary and lacks durability when for example, subjected to laundering and/or dry cleaning.

It has also been proposed heretofore that an antistatic agent be incorporated into a synthetic polymeric resin while seeking to maintain spinnability and high quality of the resulting product fiber. Typical processes representing the preceding are set forth, for example, in British Patent Specification No. 963,320 and U.S. Pat. No. 3,329,557.

Alternate processes for attempting to incorporate antistatic properties into a polymer are set forth, for example, in U.S. Pat. Nos. 3,591,563 and 3,475,898, including the prior art techniques acknowledged in columns 1 and 2 of the latter patent.

In the practice of the present invention, the particular synthetic polyamide selected to be rendered antistatic is not critical; representative polyamides which can be utilized include those known in the trade and, for example, those specifically designated in U.S. Pat. Nos. 3,388,104; 3,475,898; 3,329,557; 3,560,449; British Patent Specification No. 1,111,059; and U.S. Pat. No. 3,557,060.

It is common knowledge that fibers prepared from these conventional polyamides tend to collect and retain, for periods of time, static electrical charges when coming into contact with each other and into contact with foreign objects. This problem is particularly severe under conditions of low humidity, which is often the case during winter months. The electrostatic charge build-up on these fibers can occur quite rapidly and often dissipation of the charge into the environmental atmosphere is extremely slow. A consequence of this is that the polyamide article may remain electrostatically charged for hours at a time. This property tends to make filaments difficult to handle during manufacturing operations and results in objectionable fiber properties, particularly in wearing apparel. Electrostatically charged textile materials may not only attract each other, but may also attract such things as dust, dirt, and lint.

The accumulation of static charges and the slow dissipation thereof on polyamide fibers prevents finished, synthetic fabrics thereof from draping and wearing in a desirable manner, and causes the same to cling uncomfortably to the body of the person wearing them. Fibers having a high electrostatic susceptibility often cling to guides and rolls in textile machinery during the manufacturing and processing thereof and are sometimes seriously damaged and weakened. As a result, the quality of the end product is lower than it might otherwise be. For these reasons, and because end-uses such as garments, upholstery, hosiery, rugs, blankets, and fabrics are greatly benefited by a reduced tendency to accumulate and maintain electrostatic charges, a permanent antistatic property as an inherent characteristic of polyamide polymer and fibers produced therefrom is highly desirable.

Presently, in the commercial production of polyamide fibers, the as-spun filaments are given some treatment to improve their electrostatic and handling properties. This treatment usually consists of passing the filaments, while in the form of a bundle, through a bath or over a wheel coated with a treating of finishing liquid; the finish thus received by the filaments is a coating and is not of a permanent nature. Most, if not all, of the antistatic agent on the fiber surface is lost in subsequent processing of the filament by mechanical handling, heating, washing, scouring, and dyeing. If the antistatic agent does remain on the fiber until the final end product is produced, it often becomes less effective after the end product is used for a period of time, and especially after a number of washings or dry cleaning operations.

Efforts have been made in the past to produce permanent antistatic polyamide fibers and articles by the application of a more permanent coating. Also, efforts utilizing hydrophilic antistatic type comonomers in the polyamide formation have been tried. For various reasons, such as a resulting harsh fiber surface or sacrifice of good fiber physical properties, these methods have not been satisfactory.

An object of the present invention is to provide novel compounds which when incorporated into polyamide polymers enhance the ability of the polymers to dissipate electrical charges.

Another object of the invention is to provide modified polyamides and fibers produced therefrom which possess a high rate of dissipation of electrostatic charges.

Another object is to provide modified polyamides and fiber produced therefrom which possess a high resistance to the accumulation of electrostatic charges. The polyamides and fibers derived therefrom, when modified according to the present invention, possess a permanent antistatic property, even after multiple washings.

The synthetic polyamides of this invention can be prepared, spun, and drawn under conventional polyamide-fiber forming production conditions. In addition to the aforedescribed modifying agents, delustrants, antioxidants, plasticizers, viscosity stabilizers and other like materials can be used in the preparation of the antistatic polyamides of this invention.

SUMMARY OF THE INVENTION

The antistatic compounds of the invention are O-carboxyalkylated and ethoxylated diamines of the structure:

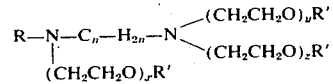

wherein the total of $x$, $y$, and $z$ is from 20 to about 200; $n$ is from 2 to 6; R is an aliphatic hydrocarbon radical of from 6 to 22 carbon atoms; and R' is independently selected from hydrogen, carboxyalkyl groups, and lower alkyl esters thereof containing 1 to 3 carbon atoms, said caraboxyalkyl groups corresponding to the formula,

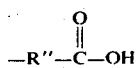

wherein R'' is -CH$_2$-,

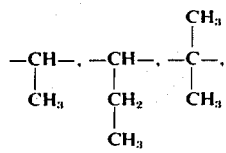

—CH$_2$—CH$_2$—, —(CH$_2$)$_3$—, or

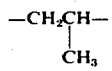

with at least one of the R' groups being a carboxyalkyl group. Hereafter, for the sake of simplicity in describing the invention, the term "carboxyalkyl group" is used to mean both carboxyalkyl group (as defined above) or lower alkyl esters thereof, e.g., methyl, ethyl, isopropyl, and especially the methyl esters. For example, it is preferred that the carboxyalkyl groups be carboxymethyl

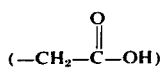

or carbomethoxymethyl

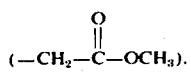

In the above diamines of the invention, either one or two carboxyalkyl groups are present, although it is within the scope of the invention to provide a diamine wherein all three R' groups are carboxyalkyl groups; e.g.,

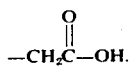

A preferred antistatic additive for synthetic polyamide is that diamine having the following structural formula and specified degree of ethoxylation:

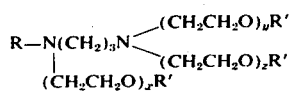

wherein the total of $x + y + z$ is from 25 to 75; R is a C$_6$ to C$_{18}$ aliphatic hydrocarbon radical derived from coconut fatty acid; and R' is either hydrogen or

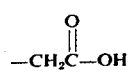

with 1 or 2 such carboxyalkyl groups being present.

The diamine compounds of the invention are prepared by reacting a highly ethoxylated diamine corresponding to the formula:

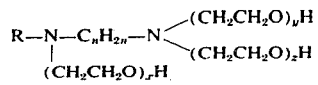

wherein $n$, $x$, $y$, $z$, and R are as described above, with sodium hydroxide, sodium ethoxide, or sodium methoxide to form the sodium alkoxide. The alkoxide is subsequently reacted with an ester derived from a carboxylic acid (or the sodium salt of the acid) wherein the alkyl group attached to the carboxyl group is substituted with a displaceable halogen (e.g., in the $\alpha$ position) such as chloride. Suitable esters include methyl chloroacetate, methyl n-chloropropionate, and methyl n-chlorobutyrate. The alkoxide is converted to the ether by this last step of reaction with the ester. The resulting diamine has ethoxy chains, at least some of which are capped by ester groups and this esterified diamine can be employed "as is", or alternatively the ester can be converted to the acid. The ester is converted to the acid diamine of the invention by reaction with sodium hydroxide followed by acidification with a mineral acid (i.e., aqueous HCl). During the synthesis, it is advisable to blanket the reaction mixture with a dry inert gas (e.g., nitrogen) to avoid adverse effects from moisture. If it is desired to produce the monocarboxyalkyl derivative, the diamine is reacted with equimolar amounts of sodium hydroxide or methoxide and with equimolar amounts of the chlorinated carboxylic acid ester or the sodium salt of the chlorinated carboxylic acid. To produce the dicarboxylated derivative, the relative amounts of the reactants (other than the diamine) are doubled. The tricarboxylated derivative is produced by tripling the amounts of the reactants employed.

In the above method of synthesis, there is no one preferred site for carboxyalkylation and therefore the ethoxylated chains of the diamine are all carboxyalkylated to some extent with the product being a mixture of $x$, $y$, and $z$ derivatives. Also, even though the reagents are reacted in specific molar proportions, some molecules will be carboxyalkylated to a lesser or greater extent than is desired; e.g., if the dicarboxyalkylated derivative is desired, small amounts of monocarboxyalkylated diamine will also be present. When used to impart antistatic properties to polyamides, it is not believed that the presence of small amounts of diamines of aberrational carboxyalkylation adversely affect the resulting antistatic properties of the polyamide.

Through use of the diamines of the invention, applicants have provided a synthetic polyamide having significant antistatic properties, said polyamide being readily processable to filament end use and in textile operations, while reflecting a most desirable antistatic characteristic in the final textile product, even after repeated launderings.

The antistatic synthetic polyamide of the present invention contains internally, an antistatic imparting amount; i.e., from about 2 weight percent to about 10 weight percent, of the ethoxylated and O-carboxyalkylated diamine. The particular means utilized to incorporate the antistatic additive selected into the polymer can vary within the skill of the art; for example, any one of the following procedures can be effectively utilized:

1. The selected additive can be added to, for example, caprolactam followed by polymerization, extrusion, and successively cooling, cutting, washing, drying, and spinning.

2. The selected additive can be added to the polymerization reaction mixture after said mixture has had some time to react.

3. An alternate procedure is one wherein the additive can be added to the polymerized mixture just prior to extrusion; this, of course, would require adequate blending through the use of a proper stirring device such as, for example, a pin mixer.

EXAMPLE I

This example illustrates the preparation of the O-carboxyalkylated ether diamines of the present invention. Sodium methoxide was admixed with an ethoxylated aliphatic hydrocarbonsubstituted diamine (precursor diamine) corresponding to the formula:

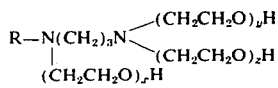

wherein: $x + y + z = 50$; and R = a $C_6$ to $C_{18}$ aliphatic hydrocarbon radical derived from coconut fatty acids by hydrolyzing coconut oil to the component fatty acids and glycerine. The precursor diamine used as starting material is prepared by reacting coconut fatty acid with ammonia to produce nitrile, hydrogenating the nitrile to produce the corresponding amine, reacting the monoamine with acrylonitrile and reducing (Ni, $H_2$) to produce the N-coco-1,3-propanediamine of the formula

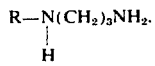

This material is reacted with approximately 50 molar equivalents of ethylene oxide to produce the precursor diamine (hydroxyl value 101, 1.8 meq. OH/g.).

The total amount of precursor diamine employed was 1256 grams (0.5 mole) and the amount of methoxide was 27.65 grams (0.5 mole). Prior to admixture with the base, the precursor diamine has been subjected to vacuum distillation on a steam bath for 1½ hours.

Reaction of the methoxide with the diamine as described above was carried out at a temperature of about 30° C. in a nitrogen atmosphere. The reactants were also agitated to achieve proper mixing. Subsequently, the mixture was heated on a steam bath and subjected to high vacuum for about 17 hours. The evolved methanol was collected in a dry ice trap. After about 4½ hours, the reaction was complete. To the residual reaction mixture was added 54.25 grams (0.5 mole) of methyl chloroacetate. Addition was carried out at 45°–50° C. over a 15 minute period under a nitrogen atmosphere, the mixture was heated on a steam bath with stirring for 24 hours. The reaction yielded 1,321.5 grams of crude ether-ester adduct of which 325.1 grams were further purified by admixing with 500 ml. of hot dry isopropyl alcohol. The remaining 996.5 grams were reacted with base (KOH) as described below. The alcohol solution was decanted and centrifuged to remove salt (NaCl) formed as a by-product of the ether synthesis. The isopropyl alcohol was removed by vacuum distillation on a steam bath to give 303.7 grams of a dark colored liquid ester corresponding generally to the formula:

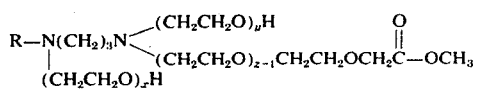

wherein $x$, $y$, $z$, and R are as defined above. Analysis of the product was as follows:

Amine — 0.758 meq./g.; neutralization equivalent 1315 (theoretical 0.774 meq./g. - N.E. - 1292)
Acid — Nil
Cl — 0.4%
$H_2O$ — Nil
Hydroxyl value — 72.5; 1.29 meq. OH/g.; theoretical based on the ethoxylated precursor diamine used as starting material - 76.2, 1.36 meq. OH/g.

In the formula for the product as given above, it will be understood that since addition of the methyl chloroacetate group can occur on each of the ethoxylated chains, the actual product would consist of a mixture wherein the carbomethoxymethyl group has been added in approximately equimolar amounts to the $x$, $y$, and $z$ chains. In addition, since equimolar amounts of the diamine and acetate were employed, addition would take place on a one-to-one basis although statistically it is probably that some of the diamine reacted with two and possibly three moles of the acetate.

The remaining 996.5 grams of crude ether-ester adduct and salt (not purified by washing with isopropyl alcohol and vacuum distillation) was added to 786 ml. of 0.48 N. KOH in ethanol under a nitrogen blanket. The mixture was refluxed for 72 hours and the alcohol was removed under vacuum. Aqueous HCl (750 ml. of 0.50 N, 0.38 equivalents) was added to convert the sodium salt to the acid form. The water was removed by vacuum distillation and the salt (NaCl) was removed by adding 1.5 liters of isopropyl alcohol, decanting, and centrifuging. Evaporation of the alcohol gave 963.5 grams of the O-carboxyalkylated diamine of the invention corresponding generally to the formula:

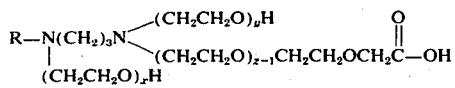

wherein $x$, $y$, $z$, and R are as defined above. Also, the extent of addition to the individual $x$, $y$, and $z$ chains and location of the carboxyalkyl groups will be on a statistical basis as described above for the intermediate methyl ester. Analysis of the acid yielded the following data:

Acid — 0.35 meq./g.; N.E. = 2850 (theoretical 0.38 meq./g.; N.E. = 2570)
Amine — 0.764 meq./g.; N.E. = 1310; (theoretical 0.778 meq./g.; N.E. = 1285)
Cl — 0.0023%
$H_2O$ — Nil
Hydroxyl value — based on ethoxylated diamine starting material (101, 1.80 meq./OH/g.) = 88.4, 1.574 meq. OH/g.; theoretical 77, 1.37 meq. OH/g.

EXAMPLE II

In a manner generally similar to that described in Example I, the precursor (i.e., ethoxylated) diamine was reacted with aqueous sodium hydroxide. Following removal of water, the alkoxide was reacted with sodium chloroacetate which was converted to the acid of Example i by acidification with hydrochloric acid followed by removal of NaCl. The reagents reacted are as follows:

Ethoxylated diamine, 628 g. (0.25 mole)
Sodium hydroxide solution, 500 ml. of 0.5N (0.25 mole)
Sodium chloroacetate, 29.12 g., (0.25 mole)
2N hydrochloric acid solution, 125 ml.; (0.25 mole)

Upon analysis of the product, the following data was obtained:

Acid Equivalent — 0.352 meq./g. (theoretical 0.389 meq./g.)
Amine Equivalent — 0.776 meq./g. (theoretical 0.778 meq./g.)
Hydroxyl value — 80.1, 1.425 meq.OH/g.: theoretical 77, 1.37 meq. OH/g., based on the ethoxylated diamine starting material (hydroxyl value 101, 1.80 meq. OH/g.)
Saponification Equivalent — 0.343 meq./g. (theoretical 0.389 meq./g.)

EXAMPLE III

In a manner generally similar to that described in Example I, the ethoxylated diamine was reacted with two molar equivalents of sodium methoxide to increase the amount of the diacid in the product. As in Example I, the methoxide was mixed with the ethoxylated diamine and disodium alkoxide was formed. Two molar equivalents of methyl chloroacetate were reacted with the sodium alkoxide in a Williamson synthesis to form the ether. The resultant ether ester was saponified with alcoholic KOH as in Example I. The alcohol was removed under vacuum and an equivalent amount of aqueous HCl was added to convert the salt to the acid form. Salt (NaCl and KCl) was removed by adding isopropyl alcohol, decanting, and centrifuging as in Example I.

The reagents employed were as follows:
Ethoxylated diamine — 1256 grams, 0.5 mole
Anhydrous sodium methoxide — 56 grams, 1.0 mole
Methyl chloroacetate — 108.5 grams, 1.0 mole
Alcoholic KOH — 65.0 g. of 86.5% KOH prepared by admixing 1.0 mole of KOH with 70 cc. $H_2O$ and 2.8 liters of ethanol
Hydrochloric acid — 2 liters of 0.5N, 1.0 mole The product obtained by removal of the isopropyl alcohol under vacuum had the following analysis:
Acid — 0.511 meq./g.; theoretical 0.76 meq./g.
Amine — 0.754 meq./g.; theoretical 0.76 meq./g.
Ester — 0.180 meq./g.; theoretical 0
Chloride — 0.29%; theoretical 0
Hydroxyl value — 61.6, 1.09 meq. OH/g.; theoretical 54, 0.96 meq. OH/g. based on starting ethoxylated diamine, hydroxyl value 101, 1.80 meq. OH/g.

The ester value indicates that saponification to the degree intended was not achieved. However, in forming amide linkages (e.g., in amide copolymerization), it is known generally that methyl esters are as reactive as the corresponding free acid.

EXAMPLE IV

As in Example I, ethoxylated diamine was reacted with an equimolar amount of sodium methoxide, care being taken to keep the reaction product free of moisture. The sodium alkoxide was reacted with sodium chloroacetate (rather than methyl chloroacetate) by heating on the steam bath for 6 hours. The sodium salt was acidified with HCl to yield the monoacid of the ethoxylated diamine. Inorganic salt was removed by adding isopropyl alcohol, decanting, and filtering. The following reagents were used:

Ethoxylated diamine — 1204 g., 0.5 mole
Anhydrous sodium methoxide — 27.65 g., 0.5 mole
Sodium chloroacetate — 58.25 g., 0.5 mole
Hydrochloric acid — 1 liter of 0.5N, 0.5 mole The product recovered after evaporation of the isopropyl alcohol under vacuum had the following analysis:
Acid — 0.34 meq./g.; theoretical 0.40 meq./g.
Amine — 0.82 meq./g.; theoretical 0.81 meq./g.
Chloride — trace
Hydroxyl value — 63.6, 1.13 meq. OH/g.; theoretical 72, 1.28 meq. OH/g. based on starting ethoxylated diamine, hydroxyl value 96.8, 1.72 meq. OH/g.

EXAMPLE V

Semidull nylon chips containing 15 ppm manganese, 0.48% $TiO_2$ having a relative viscosity of 216 were placed in a laboratory melt blending apparatus consisting of a round-bottomed glass vessel (1 liter volume) with removable stainless steel top (resin kettle). The vessel was equipped with a stirrer, a Dowtherm vapor heater (256° C.), an addition port, and a nitrogen inlet. An antistatic diamine of the following formula:

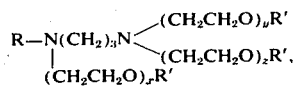

wherein $x + y + z = 50$; and R = a $C_6$ to $C_{18}$ aliphatic hydrocarbon radical derived from coconut fatty acid and wherein one of the R' groups is

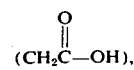

the other R' groups being hydrogen was melted and poured onto the chips in the vessel at 4 weight percent to give a batch of nylon and additive totaling 300 g. The sample was heated without stirring at 256° C. for a period of 1½ hours to allow melting before engaging the stirrer. After 30 minutes of stirring, the polymer blend was extruded as spaghetti through an opening drilled into the bottom of the flask. The extruded polymer was cooled in a water bath. After drying, the sample was spun and drawn as 30/6 filament on a spinning machine.

Part of the yarn sample was knitted into hose on a tube knitter (240 needles, 70 gauge) using a single end feed. This hose was first scoured for 20 minutes with water and detergent at 38° C., then washed for 2 hours with water and detergent at 50° C. The detergent was a common laundry detergent such as Tide XK, used at 12.2 g. per liter. After drying, the resistance of the yarn was determined at 30% RH and 20° C.

The remainder of the yarn sample was knitted into hose on a tube knitter (340 needles, 70 gauge) using a double end feed. This hose was scoured and washed as described above. After heat setting, the antistatic properties were determined with a modified AATCC Test Procedure 115-1965 (Cling Test), using 30% RH, 75° F., and a 30° fabric angle as test conditions. Important testing parameters include relative humidity (% RH) during testing, fabric construction, fabric weight, test angle, number of times the fabrics have been washed.

A control sample of polyamide not containing antistatic additive was also processed and tested as described above. The test data for the control showed yarn resistance (ohm) at 30%, RH was $4.5 \times 10^{15}$ and at 40% RH the sample exhibited a cling time in excess of 120 minutes.

The sample containing antistatic additive showed a resistance at 30% RH of $1.6 \times 10^{12}$ ohms. At 20% RH, the cling time was 6.7 minutes, and at 30% RH, the cling time was 3.2 minutes.

EXAMPLE VI

The testing procedure was followed as in Example V with the exception that the antistatic additive employed was the diacid derivative of the ethoxylated diamine rather than the monoacid derivative. The carboxyalkyl group was

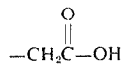

as in Example V. The test data for the sample showed that at 30% RH the resistance was $3.5 \times 10^{12}$ ohms. The cling time at 20% RH was 11.7 minutes, and at 30% RH, the cling time was 4.5 minutes.

Both cling times and yarn resistances indicate that the samples modified with the diamine antistat have antistatic properties which are superior to those of the control.

The preceding representative examples can be varied within the scope of this total specification disclosure as it would be construed and practiced by one skilled in the art. Diamine starting material, degree of ethoxylation, type and extent of carboxyalkylation of the ethoxylated chains, as well as the type of polyamide and weight percent of the diamine uniformly dispersed in said polyamide, each of these factors can be varied within the context of the present specification as necessary to supply different needs. All of such variations are within the scope of the invention.

As stated herein, from about 2 weight percent to about 10 weight percent of the ethoxylated diamine is internally dispersed in the antistatic polyamide product produced in the practice of the present invention. The use of less than about 2 weight percent diamine would not reflect as significant an antistat property in the polyamide product and the use of more than about 10 weight percent would not only be uneconomical and unnecessary, but would also adversely affect processing of end use polyamide products such as fibers and filaments.

The specified high degree of ethoxylation is necessary to achieve the significant antistatic results for the polyamide products represented in the preceding examples. If the ethylene oxide is added at an excess over about 200 mole equivalent, less antistatic effect is achieved for the amount of ethylene oxide used. At least about 20 mole equivalent ethylene oxide (per mole of diamine) is needed, however, to achieve the significant antistatic properties evidenced in the polyamide products produced. This high degree of ethoxylation of the diamine had additional benefits of increased water solubility and improved spinnability of the polyamide which are beneficial when the polyamide is processed into fiber and/or filament.

An example of a preferred ethoxylated and carboxyalkylated (i.e., fatty acid derived from coconut oil) diamine is that diamine produced from coco fatty acid wherein R is $C_6$ to $C_{18}$ aliphatic hydrocarbon radical and ethylene oxide has been added at 50 mole equivalent. This amine ethoxylation procedure is known in the art and generally involves a two-step procedure wherein (1) said diamine is ethoxylated with one mole of ethylene oxide per available hydrogen at from about 160° to about 170° C., without use of a catalyst, followed by (2) addition of catalyst, such as caustic, and further addition of ethylene oxide at up to 200° C., to thus effect uniform addition of ethylene oxide to said diamine.

Antistatic synthetic polyamide filaments produced in the practice of this invention can be combined with one or more filaments of different composition and further utilized in various ways known to one skilled in the art and/or as specifically set forth, for example, in Column 23, of U.S. Pat. No. 3,475,898. In addition, the antistatic polyamide compositions of this invention can be readily formed into film, sheet, tubing, casting, and other useful articles by means known to the trade. Said polyamide, for example, can also be knitted (mixed) with non-antistatic polyamide filaments of the same or different denier to produce a fabric having a desirable degree of antistatic property.

It is understood that the generally known polyamide additives such as dyes, pigments, filler, and plastics, and lubricants can be effectively utilized with the herein described and claimed ethoxylated amine antistat additives and not adversely affect the desired antistatic properties.

What is claimed is:

1. An antistatic composition for synthetic polyamide polymers consisting essentially of a mixture of O-carboxyalkylated and ethoxylated diamines prepared by reacting an ethoxylated diamine of the general formula:

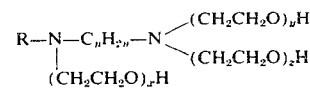

wherein $n$ is an integer from 2 to 6; the total of $x$, $y$ and $z$ is from about 20 to about 200; and R is an aliphatic hydrocarbon group having 6 to 22 carbon atoms; with sodium hydroxide or sodium alkoxide, and then reacting with an $\alpha$-chloro-aliphatic carboxylic acid or its lower alkyl ester of the formula

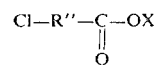

wherein X is a member of the group consisting of hydrogen and alkyl of 1 to 3 carbon atoms; and R'' is selected from the group consisting of:

$$-CH_2-, \quad -\underset{CH_3}{\overset{}{CH}}-,$$

$$-\underset{\underset{CH_2}{|}}{\overset{CH_3}{\underset{|}{CH}}}-, \quad -\underset{\underset{CH_2}{|}}{\overset{CH_3}{\underset{|}{C}}}-, \quad -CH_2-CH_2-, \quad (CH_2)_3-, \quad \text{and}$$

$$-CH_2\underset{CH_3}{\overset{}{\underset{|}{CH}}}-;$$

said mixture containing at least one O-carboxylated diamine component.

2. A composition according to claim 1 wherein the total of $x + y + z$ is from 25 to 75; $n$ is 3; and R is a $C_6$ to $C_{18}$ aliphatic hydrocarbon radical obtained from coconut fatty acid.

* * * * *